US011880471B2

United States Patent
Yan

(10) Patent No.: US 11,880,471 B2
(45) Date of Patent: Jan. 23, 2024

(54) PASSWORD HARDCODING CHECKING METHOD AND APPARATUS BASED ON PCA, AND MEDIUM

(71) Applicant: INSPUR SUZHOU INTELLIGENT TECHNOLOGY CO., LTD., Jiangsu (CN)

(72) Inventor: Lihua Yan, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/012,927

(22) PCT Filed: Jun. 30, 2021

(86) PCT No.: PCT/CN2021/103381
§ 371 (c)(1),
(2) Date: Dec. 25, 2022

(87) PCT Pub. No.: WO2022/048283
PCT Pub. Date: Mar. 10, 2022

(65) Prior Publication Data
US 2023/0195903 A1    Jun. 22, 2023

(30) Foreign Application Priority Data
Sep. 3, 2020 (CN) .......................... 202010917043.1

(51) Int. Cl.
*G06F 21/57* (2013.01)
(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS 9,336,381 B1*   5/2016   Kane-Parry ............. G06F 21/50
10,387,659 B1*  8/2019   Youngberg ........... G06F 21/562
(Continued)

FOREIGN PATENT DOCUMENTS

| CN | 108897678 A | 11/2018 |
| CN | 109446107 A | 3/2019 |

(Continued)

OTHER PUBLICATIONS

PCT/CN2021/103381 international search report.

*Primary Examiner* — Fatoumata Traore
(74) *Attorney, Agent, or Firm* — IPRO, PLLC

(57) ABSTRACT

A password hardcoding checking method and apparatus based on PCA, and a medium. the checking method includes: step one, data collection, involving: collecting function code blocks in which data of password hardcoding that is subject to a false alarm is located; step two, extracting feature values in the function code blocks collected in step one, so as to obtain a feature set; step three, using the function code blocks collected in step one to serve as samples to construct a PCA model; and step four, on the basis of the PCA model constructed in step three and the feature set obtained in step two, detecting whether there is a false alarm in password hardcoding. by means of the method, the false alarm rate of hardcoding checking in code scanning is reduced, and the working efficiency of a developer and a code auditor is improved.

18 Claims, 3 Drawing Sheets

(56) References Cited

U.S. PATENT DOCUMENTS

| | | | | |
|---|---|---|---|---|
| 2015/0178264 A1* | 6/2015 | Liu | ...................... | G06F 40/194 |
| | | | | 715/237 |
| 2019/0180035 A1 | 6/2019 | Esperer et al. | | |
| 2020/0349259 A1* | 11/2020 | Tsai | ...................... | G06F 21/562 |
| 2021/0240834 A1* | 8/2021 | Trabelsi | ................. | G06N 20/20 |

FOREIGN PATENT DOCUMENTS

| | | |
|---|---|---|
| CN | 109726120 A | 5/2019 |
| CN | 111399848 A | 7/2020 |
| CN | 112131570 A | 12/2020 |

\* cited by examiner

PASSWORD HARDCODING CHECKING METHOD AND APPARATUS BASED ON PCA, AND MEDIUM

CROSS-REFERENCE TO RELATED APPLICATION

The present disclosure claims the priority of the Chinese patent application filed on Sep. 3, 2020 before the CNIPA, China National Intellectual Property Administration with the application number of 202010917043.1 and the title of "PASSWORD HARDCODING CHECKING METHOD AND APPARATUS BASED ON PCA, AND MEDIUM", which is incorporated herein in its entirety by reference.

FIELD

The present disclosure relates to the technical field of password hard-coding detection and, more particularly, to a Principal Components Analysis (PCA)-based password hard-coding detection method, device and medium.

BACKGROUND

Password hard-coding refers to that a password is directly written into a code in a plaintext form, and the manner may cause a serious security risk to an enterprise and a client. Main hazards include two aspects: (1) anyone who gets a code may obtain a user name and a password; and (2) after the code is put into use, software must be repaired to change an encryption key. If an account protected by the encryption key is invaded, a system owner must make a selection between security and usability.

Therefore, in order to lower the existing security risk, security scanning is performed for the code before the code is put into use, and a common scanning tool is a fortify scanning tool. Fortify is a static code scanning tool, which may help a programmer analyze a bug of a sound code; and once a security problem is detected, a security coding rule package may provide information of the relevant problems. But, the false alarm rate of fortify for password hard-coding is very high, so that in order to confirm whether an alarm is a false alarm, a developer needs to perform secondary verification and confirmation for the password hard-coding problems, which are scanned by fortify, one by one. False alarm situations need to be added into a filtering rule. Under a condition that the false alarms for password hard-coding are more, the working efficiency of the developer is greatly reduced.

An artificial secondary re-checking manner has the following two problems:
1. the developer spends a lot of energy on re-checking and recording, thereby reducing the development efficiency; and
2. when security auditing is performed for a project code, each problem needs to be audited, thereby reducing the auditing efficiency.

Therefore, it is very necessary to reduce the false alarm rate for password hard-coding in the code.

SUMMARY

In order to solve the above problems, the present disclosure provides a PCA-based password hard-coding detection method, device and medium, which may reduce the false alarm rate for hard-coding detection in code scanning and improve the quality and the efficiency of code scanning and code auditing.

In order to achieve the above purposes, the present disclosure adopts the following technical solution:

The PCA-based password hard-coding detection method includes the following steps:

Step 1, performing data collection by collecting a function code block where password hard-coding false alarm data is located;

Step 2, extracting feature values in the function code blocks collected in Step 1 to obtain a feature set;

Step 3, constructing a PCA model by utilizing the function code blocks collected in Step 1 as samples; and Step 4, detecting whether a false alarm for password hard-coding exists based on the PCA model constructed in Step 3 and the feature set obtained in Step 2.

In Step 1, according to an actual project code of code scanning of fortify, the password hard-coding false alarm data is detected; the function code blocks, in which the password hard-coding false alarm data is located, are collected; and the function code blocks are initial sample data.

In Step 2, the extracted feature values in the function code blocks include a code length, a type of a function return value, a type of a return value for calling a key, a quantity of times of calling the key in abnormal codes, a quantity of keywords included in the code blocks, and a quantity of keywords included in notes.

The key is a variable assigned as a specific character string in a function.

The keywords included in the code blocks include but not limited to: 'key', 'password', 'pwd', 'passwd', 'encryption', 'decrypt', 'generate', 'SHA256' and 'AES' or 'DES'.

Step 3 includes:

Step 3.1, under a condition that the function code blocks collected in Step 1 are samples, a quantity of which is n, and n is an integer greater than 0; and each sample includes m types of attributes, and m is an integer greater than 0, extracting a group of feature sets F from each sample to obtain F=($F_1$, $F_2$ ... $F_m$), wherein $F_m$ represents an $m^{th}$ attribute of the sample;

Step 3.2, calculating a covariance matrix C;

Step 3.3, acquiring feature values of the covariance matrix C and corresponding feature vectors by adopting singular value decomposition; and Step 3.4, arranging the feature vectors into a matrix U from top to bottom according to a size of the corresponding feature values by rows.

Step 3.2 includes:

$$\varphi_i = F_i - \frac{1}{n}\sum\nolimits_{j=1}^{n} F_j,$$

wherein a value range of i is [1, m], a value range of j is [1, n], $\varphi_i$ is a φ value of an $i^{th}$ feature, and Fj is a $j^{th}$ attribute of the sample; and $$C = \frac{1}{m}XX^T, X = \begin{pmatrix} \varphi_{11} & \cdots & \varphi_{1m} \\ \vdots & \vdots & \vdots \\ \varphi_{n1} & \cdots & \varphi_{nm} \end{pmatrix},$$

wherein $\varphi_{nm}$ is a φ value of an $m^{th}$ feature of an $n^{th}$ sample.

Step 4 includes:

Step 4.1, extracting feature values for a code segment to-be-detected by utilizing a method in Step 2 to obtain a feature set;

Step 4.2, calculating a distance d from the feature set obtained in Step 4.1 to the matrix U; and Step 4.3, setting a threshold σ, wherein on a condition that the distance calculated in Step 4.2 is within the threshold range belongs to a false alarm.

The PCA-based password hard-coding detection device includes:

a data collection module configured for collecting the data and collecting the function code blocks, in which the password hard-coding false alarm data is located;

a feature set calculation module configured for extracting the feature values of the function code blocks to obtain the feature set;

a PCA model construction module configured for constructing the PCA model; and a detection module configured for detecting whether the false alarm for password hard-coding exists.

A computer-readable storage medium, storing a computer program that is executed by a processor, and upon execution by the processor, is configured to cause the processor to implement the steps of the PCA-based password hard-coding detection method.

The present disclosure has the beneficial effects that:

According to the method of the present disclosure, the false alarm rate for hard-coding detection in code scanning is reduced, and the working efficiency of a developer and a code auditor is improved.

DETAILED DESCRIPTION OF THE EMBODIMENTS

The present disclosure is further described hereinafter through combination with the drawings and embodiments.

Figure 1:
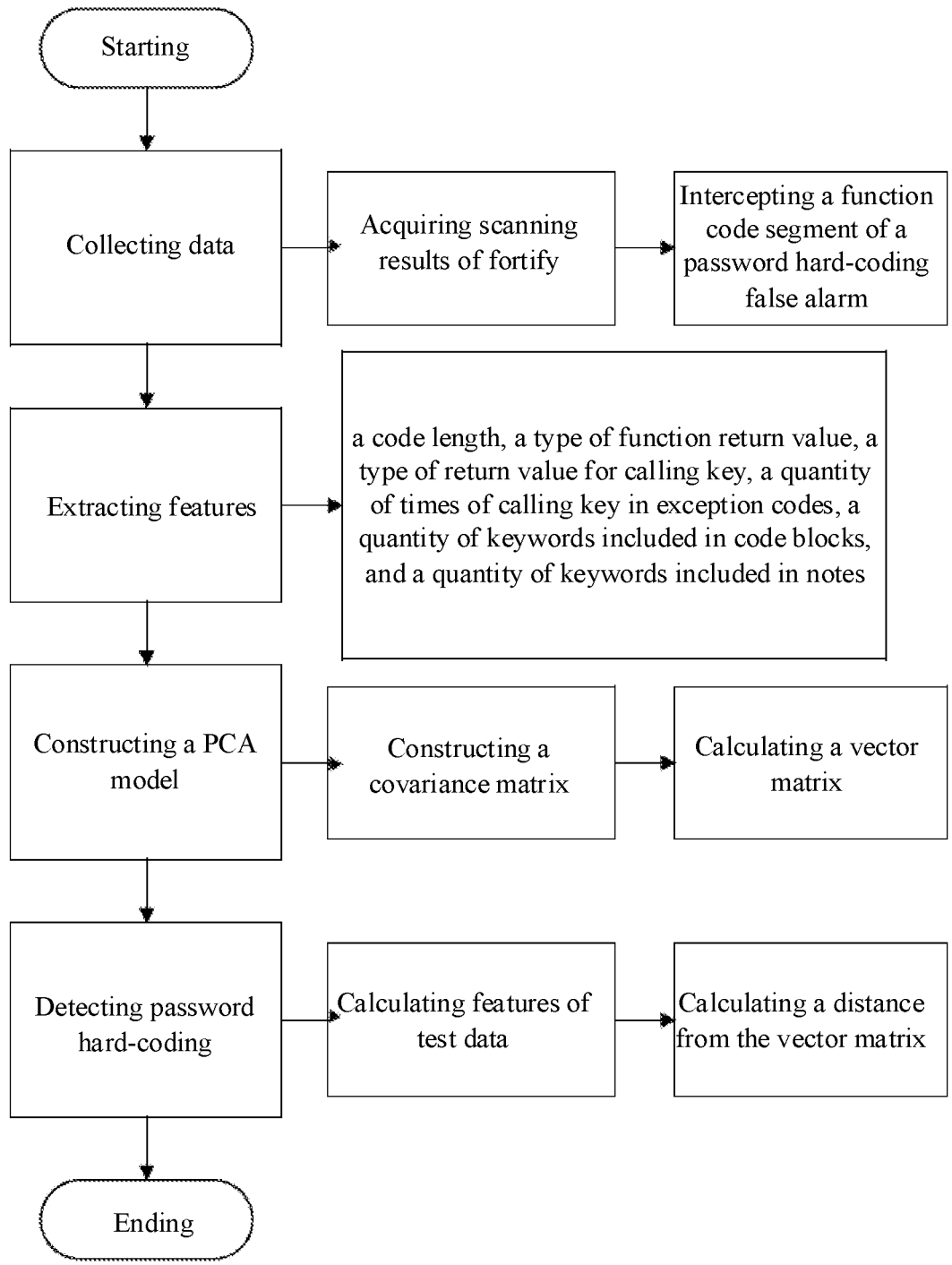
FIG. 1 is a flow chart of a method of the present disclosure.

As shown in FIG. 1, a PCA-based password hard-coding detection method includes:

Step 1, data collection: in the present disclosure, collecting password hard-coding false alarm data, i.e., according to an actual project code of code scanning of fortify, detecting the password hard-coding false alarm data and collecting functions in which the data is located, wherein function code blocks are initial sample data;

Step 2, feature extraction:

extracting feature values in the function code blocks collected in Step 1 to obtain a feature set, wherein the determination for whether the function performance is password hard-coding from the function code blocks may be analyzed from the whole feature of the function code blocks:

the code length: function codes of password hard-coding are relatively less, other functional codes have more possibility, and therefore, the code length of the function blocks may serve as one of features;

the type of a function return value: the possibility that a function return character string of password hard-coding is null is greater, and the types of return values of other functional codes are diverse;

the type of a return value for calling a key: here, the key is a variable assigned as a specific character string in a function; and more returns in the calling of password hard-coding for the key are character strings, and other functional codes include various types of codes, such as Boolean, object.

A quantity of times of calling the key in abnormal codes: in the password hard-coding, the possibility that the calling for the key appears in abnormal blocks is small, and therefore, the quantity of times of calling the key in abnormal code blocks is also an important feature.

A quantity of keywords included in the code blocks: the keywords in the algorithm include but not limited to the following fields: 'key (a variable in the function)', 'password', 'pwd', 'passwd', 'encryption', 'decrypt', 'generate', '(Secure Hash Algorithm 256) SHA256', 'Advanced Encryption Standard (AES)' or '(Data Encryption Standard) DES' and the like; and the keywords reflect the performances of the functions to a certain extent.

A quantity of keywords included in notes: the performances and the thoughts of the functions are described in the notes, so that the quantity of the keywords in the notes may play a role in the determination of whether password hard-coding exists.

In conclusion, the above six features are extracted for each code block as the features of the code block to obtain the feature set.

Step 3, a PCA construction model:

wherein PCA refers to a principal components analysis technology, which aims to convert multiple indexes into a few comprehensive indexes by utilizing a dimensionality reduction thought; multiple variables of original data are converted into a plurality of variables linearly independent of each dimensionality through linear conversion, and the variables maximumly represent the amount of information of the original data; and the calculation process includes:

Step 3.1, under a condition that the function code blocks collected in Step 1 are samples, the quantity of which is n, and the greater n is, the better n is, and the optimum value of n is greater than 500; and each sample includes m types of attributes, obtaining $F=(F_1, F_2 \ldots F_m)$, wherein in the embodiment, m is equal to 6, $F_m$ represents an $m^{th}$ attribute of the sample;

Step 3.2, calculating a covariance matrix C:

$$\varphi_1 = F_i - \frac{1}{n}\sum_{j=1}^{n} F_j,$$

wherein φ is a common variable and represents a value after a feature value is standardized, i.e., a value of current feature values minus a mean value of the current feature values; $\varphi_i$ is a φ value of an $i^{th}$ feature; a value range of i is [1, m], a value range of j is [1, n]; and Fj is a $j^{th}$ attribute of the sample; and $$C = \frac{1}{m}XX^T, X = \begin{pmatrix} \varphi_{11} & \cdots & \varphi_{1m} \\ \vdots & \vdots & \vdots \\ \varphi_{n1} & \cdots & \varphi_{nm} \end{pmatrix},$$

wherein $\varphi_{nm}$ is a φ value of an $m^{th}$ feature of an $n^{th}$ sample;

Step 3.3, acquiring feature values of the covariance matrix C and corresponding feature vectors by adopting singular value decomposition; and Step 3.4, arranging the feature vectors into a matrix U from top to bottom according to a size of the corresponding feature values by rows; and Step 4, detection for password hard-coding based on the PCA model:

Step 4.1, extracting feature values for a code segment to-be-detected by utilizing a method in Step 2 to obtain a feature set;

Step 4.2, calculating a distance from the feature set obtained in Step 4.1 to the matrix U.

The feature set obtained in Step 4.1 is a 1*m matrix F=(F$_1$, F$_2$ . . . F$_m$), the matrix U is a m*m matrix, and the distance d obtained by calculation is:

$$d = \sqrt{\sum_{i=1}^{m}\sum_{j=1}^{m}(F_j - U_{ji})^2}$$

wherein Fj is a value of a j$^{th}$ column in the matrix F, and U$_{ji}$ is a value of a j$^{th}$ row and an i$^{th}$ column in the matrix U; and Step 4.3, setting a threshold a, wherein on a condition that the distance is within the threshold range, the distance belongs to a false alarm.

Figure 2:
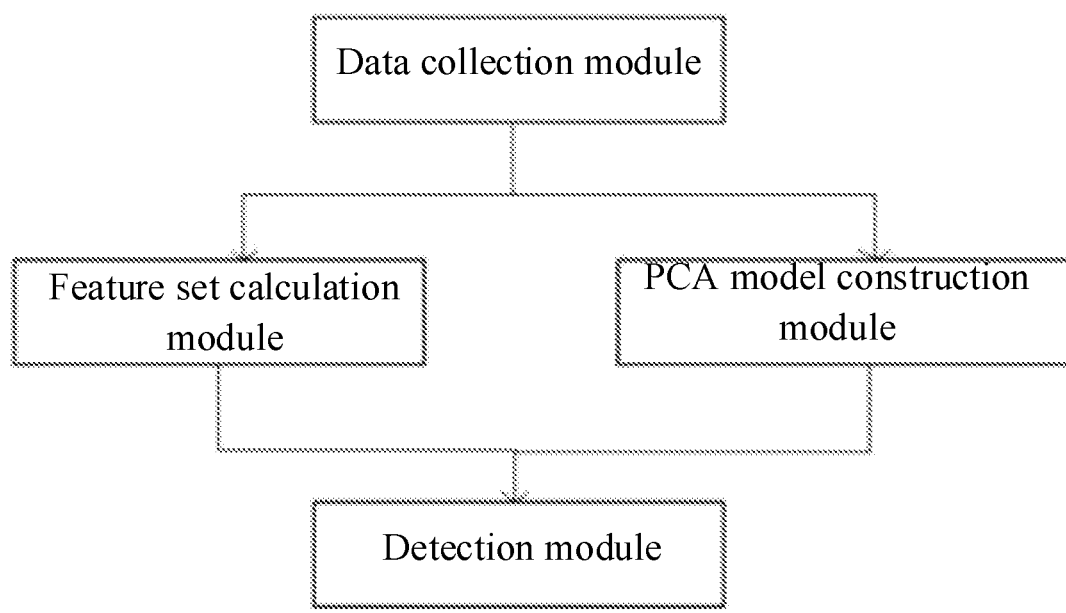
FIG. 2 is a module diagram of a PCA-based password hard-coding detection device.

As shown in FIG. 2, a PCA-based password hard-coding detection device includes:

a data collection module configured for collecting the data and collecting the function code blocks, in which the password hard-coding false alarm data is located;

a feature set calculation module configured for extracting the feature values in the function code blocks collected by the data collection module to obtain the feature set;

a PCA model construction module configured for constructing the PCA model by utilizing the function code blocks collected by the data collection module as the samples; and a detection module configured for detecting whether the false alarm for password hard-coding exists by utilizing the PCA model constructed by the PCA model construction module and the feature set calculated by the feature set calculation module.

A computer-readable storage medium is provided; computer programs are stored on the computer-readable storage medium; and the computer programs are executed by a processor to implement the steps of the PCA-based password hard-coding detection method.

Figure 3:
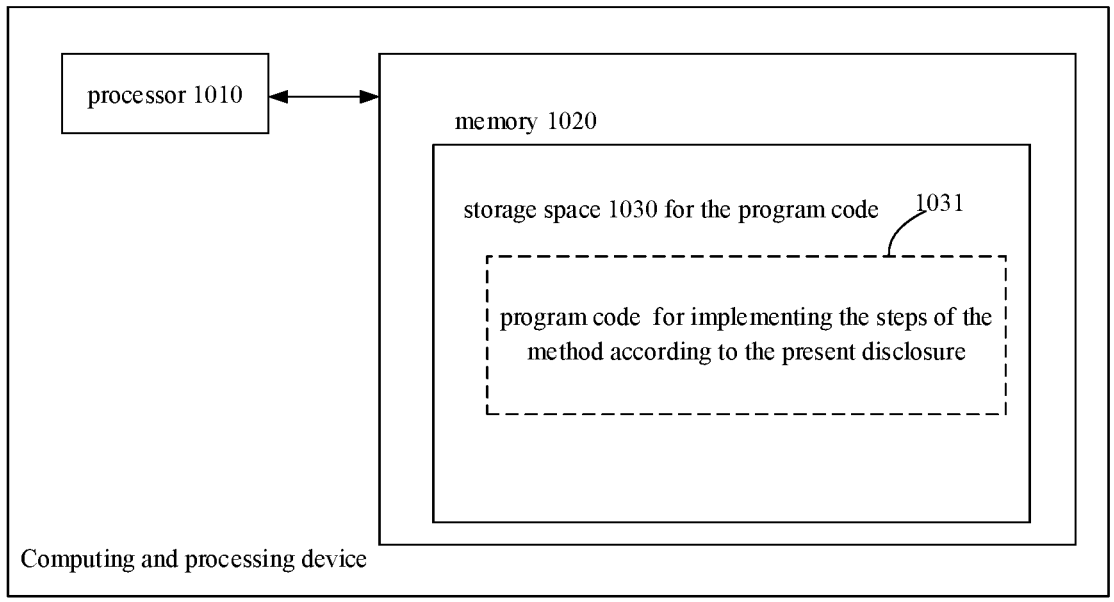
FIG. 3 schematically shows a block diagram of a computing processing device for executing the method according to the present disclosure.
Figure 4:
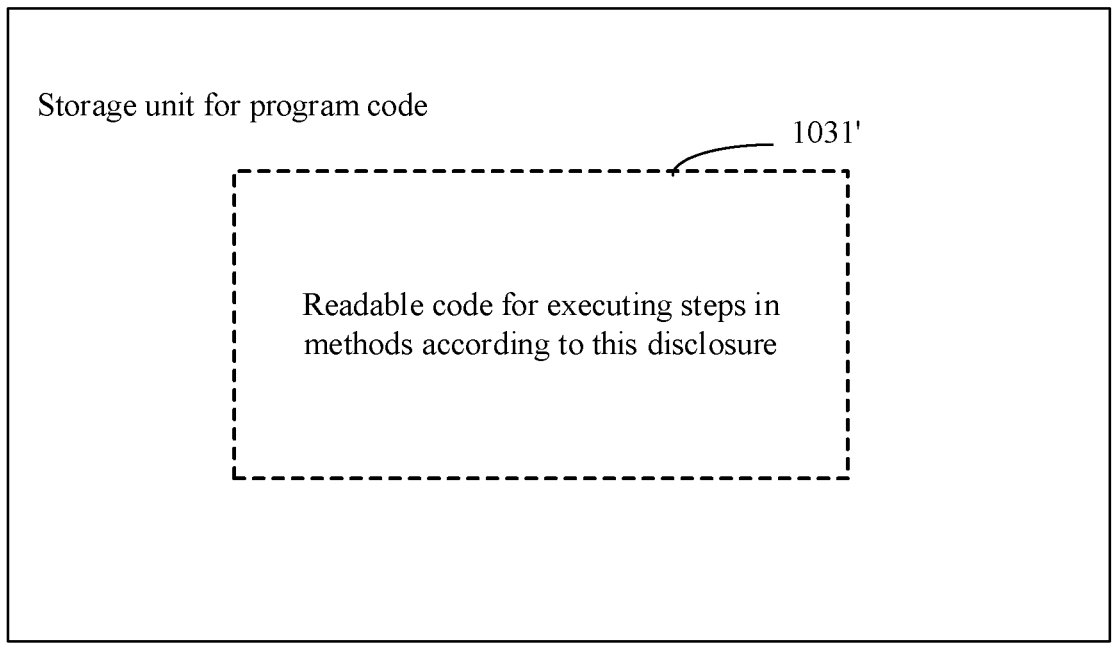
FIG. 4 schematically shows a storage unit for holding or carrying program codes for implementing the method according to the present disclosure.

For example, FIG. 3 shows a computing and processing device that can implement the method according to the present disclosure. The computing and processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 4. The storage unit may have storage segments or storage spaces with similar arrangement to the memory 1020 of the computing and processing device in FIG. 3. The program codes may, for example, be compressed in a suitable form. Generally, the storage unit contains a computer-readable code 1031', which can be read by a processor like 1010. When those codes are executed by the computing and processing device, the codes cause the computing and processing device to implement each of the steps of the method described above.

Although the above-mentioned specific implementation methods of the present application are described in combination with the attached drawings, they are not limited to the scope of protection of the present application. The technical personnel in the field should understand that on the basis of the technical scheme of the present application, the technical personnel in this field do not need to pay creative labor. The various modifications or deformations that may be made are still within the scope of protection of the present application.

The invention claimed is:

1. A PCA-based password hard-coding detection method, comprising:

Step 1, performing data collection by collecting a function code block where password hard-coding false alarm data is located;

Step 2, extracting feature values in the function code blocks collected in Step 1 to obtain a feature set;

Step 3, constructing a PCA model by utilizing the function code blocks collected in Step 1 as samples; and Step 4, detecting whether a false alarm for password hard-coding exists based on the PCA model constructed in Step 3 and the feature set obtained in Step 2;

wherein Step 3 comprises:

Step 3.1, under a condition that the function code blocks collected in Step 1 are samples, a quantity of which is n, and n is an integer greater than 0; and each sample comprises m types of attributes, and m is an integer greater than 0, extracting a group of feature sets F from each sample to obtain F=(F$_1$, F$_2$ . . . F$_m$), wherein F$_m$ represents an m$^{th}$ attribute of the sample;

Step 3.2, calculating a covariance matrix C;

Step 3.3, acquiring feature values of the covariance matrix C and corresponding feature vectors by adopting singular value decomposition; and Step 3.4, arranging the feature vectors into a matrix U from top to bottom according to a size of the corresponding feature values by rows.

2. The PCA-based password hard-coding detection method according to claim 1, wherein in Step 1, according to an actual project code of code scanning of fortify, the password hard-coding false alarm data is detected; the function code blocks, in which the password hard-coding false alarm data is located, are collected; and the function code blocks are initial sample data.

3. The PCA-based password hard-coding detection method according to claim 1, wherein in Step 2, the extracted feature values in the function code blocks comprise a code length, a type of a function return value, a type of a return value for calling a key, a quantity of times of calling the key in abnormal codes, a quantity of keywords comprised in the code blocks, and a quantity of keywords comprised in notes.

4. The PCA-based password hard-coding detection method according to claim 3, wherein the key is a variable assigned as a specific character string in a function.

5. The PCA-based password hard-coding detection method according to claim 3, wherein the keywords comprised in the code blocks comprise but not limited to: 'key', 'password', 'pwd', 'passwd', 'encryption', 'decrypt', 'generate', 'Secure Hash Algorithm 256 SHA256' and 'Advanced Encryption Standard AES' or 'Data Encryption Standard DES'.

6. The PCA-based password hard-coding detection method according to claim 3, wherein the type of the return value for calling the key comprises at least one of a character string, a Boolean and an object.

7. The PCA-based password hard-coding detection method according to claim 1, wherein Step 3.2 comprises:

$$\varphi_i = F_i - \frac{1}{n}\sum_{j=1}^{n} F_j,$$

wherein $\varphi_i$ is a $\varphi$ value of an $i^{th}$ feature, a value range of i is [1, m], and Fj is a $j^{th}$ attribute of the sample, a value range of j is [1, n]; and $$C = \frac{1}{m}XX^T, X = \begin{pmatrix} \varphi_{11} & \cdots & \varphi_{1m} \\ \vdots & \ddots & \vdots \\ \varphi_{n1} & \cdots & \varphi_{nm} \end{pmatrix},$$

wherein $\varphi_{nm}$ is a $\varphi$ value of an $m^{th}$ feature of an $n^{th}$ sample.

8. The PCA-based password hard-coding detection method according to claim 1, wherein Step 4 comprises:
Step 4.1, extracting feature values for a code segment to-be-detected by utilizing a method in Step 2 to obtain a feature set;
Step 4.2, calculating a distance d from the feature set obtained in Step 4.1 to the matrix U; and
Step 4.3, setting a threshold σ, wherein on a condition that the distance calculated in Step 4.2 is within the threshold range belongs to a false alarm.

9. The PCA-based password hard-coding detection method according to claim 8, wherein the feature set obtained in Step 4.1 is a 1*m matrix F=(F$_1$, F$_2$ ... F$_m$), the matrix U is a m*m matrix, and the distance d obtained by calculation is:

$$d = \sqrt{\sum_{i=1}^{m}\sum_{1=1}^{m}(F_j - U_{ji})^2},$$

wherein Fj is a value of a $j^{th}$ column in the matrix F, and $U_{ji}$ is a value of a $j^{th}$ row and an $i^{th}$ column in the matrix U.

10. The PCA-based password hard-coding detection method according to claim 1, wherein φ is a common variable and represents a value after a feature value is standardized.

11. A Principal Component Analysis (PCA)-based password hard-coding detection device, comprising:
a processor; and a memory, storing a computer program that is executed by a processor, and upon execution by the processor, is configured to cause the processor to:
collect the data and collecting the function code blocks, in which the password hard-coding false alarm data is located;
extract the feature values of the function code blocks to obtain the feature set;
construct the PCA model; and
detect whether the false alarm for password hard-coding exists;
wherein Step 3 comprises:
Step 3.1. under a condition that the function code blocks collected in Step 1 are samples, a quantity of which is n, and n is an integer greater than 0; and each sample comprises m types of attributes, and m is an integer greater than 0, extracting a group of feature sets F from each sample to obtain F=(F$_1$, F$_2$ ... F$_m$), wherein F$_m$ represents an $m^{th}$ attribute of the sample.
Step 3.2, calculating a covariance matrix C;
Step 3.3, acquiring feature values of the covariance matrix C and corresponding feature vectors by adopting singular value decomposition; and
Step 3.4, arranging the feature vectors into a matrix U from top to bottom according to a size of the corresponding feature values by rows.

12. The PCA-based password hard-coding detection device according to claim 11, wherein in Step 1, according to an actual project code of code scanning of fortify, the password hard-coding false alarm data is detected; the function code blocks, in which the password hard-coding false alarm data is located, are collected; and the function code blocks are initial sample data.

13. The PCA-based password hard-coding detection device according to claim 11, wherein in Step 2, the extracted feature values in the function code blocks comprise a code length, a type of a function return value, a type of a return value for calling a key, a quantity of times of calling the key in abnormal codes, a quantity of keywords comprised in the code blocks, and a quantity of keywords comprised in notes.

14. The PCA-based password hard-coding detection device according to claim 13, wherein the key is a variable assigned as a specific character string in a function.

15. The PCA-based password hard-coding detection device according to claim 13, wherein the keywords comprised in the code blocks comprise but not limited to: 'key', 'password', 'pwd', 'passwd', 'encryption', 'decrypt', 'generate', 'Secure Hash Algorithm 256 SHA256' and 'Advanced Encryption Standard AES' or 'Data Encryption Standard DES'.

16. The PCA-based password hard-coding detection device according to claim 11, wherein Step 3.2 comprises:

$$\varphi_i = F_i - \frac{1}{n}\sum_{j=1}^{n} F_j,$$

wherein $\varphi_i$ is a $\varphi$ value of an $i^{th}$ feature, a value range of i is [1, m], and Fj is a $j^{th}$ attribute of the sample, a value range of j is [1, n]; and $$C = \frac{1}{m}XX^T, X = \begin{pmatrix} \varphi_{11} & \cdots & \varphi_{1m} \\ \vdots & \ddots & \vdots \\ \varphi_{n1} & \cdots & \varphi_{nm} \end{pmatrix},$$

wherein $\varphi_{nm}$ is a $\varphi$ value of an $m^{th}$ feature of an $n^{th}$ sample.

17. The PCA-based password hard-coding detection device according to claim 11, wherein Step 4 comprises:

Step 4.1, extracting feature values for a code segment to-be-detected by utilizing a method in Step 2 to obtain a feature set;

Step 4.2, calculating a distance d from the feature set obtained in Step 4.1 to the matrix U; and Step 4.3, setting a threshold σ, wherein on a condition that the distance calculated in Step 4.2 is within the threshold range belongs to a false alarm.

18. A non-transitory computer-readable storage medium, storing a computer program that is executed by a processor, and upon execution by the processor, is configured to cause the processor to implement operations comprising:

Step 1, collecting data and collecting function code blocks in which password hard-coding false alarm data is located;

Step 2, extracting feature values in the function code blocks collected in Step 1 to obtain a feature set;

Step 3, constructing a Principal Component Analysis (PCA) model by utilizing the function code blocks collected in Step 1 as samples; and Step 4, detecting whether a false alarm for password hard-coding exists based on the PCA model constructed in Step 3 and the feature set obtained in Step 2;

wherein Step 3 comprises:

Step 3.1. under a condition that the function code blocks collected in Step 1 are samples, a quantity of which is n, and n is an integer greater than 0; and each sample comprises m types of attributes, and m is an integer greater than 0, extracting a group of feature sets F from each sample to obtain $F=(F_1, F_2 \ldots F_m)$, wherein $F_m$ represents an $m^{th}$ attribute of the sample;

Step 3.2, calculating a covariance matrix C;

Step 3.3, acquiring feature values of the covariance matrix C and corresponding feature vectors by adopting singular value decomposition; and Step 3.4. arranging the feature vectors into a matrix U from top to bottom according to a size of the corresponding feature values by rows.

* * * * *